UNITED STATES PATENT OFFICE.

FRITZ BENDER, OF MÜHLHEIM, GERMANY, ASSIGNOR TO FARBWERK MÜHLHEIM, VORMALS A. LEONHARDT & CO., OF SAME PLACE.

AMIDONAPHTHOLDISULFO-ACID AND PROCESS OF MAKING SAME.

SPECIFICATION forming part of Letters Patent No. 606,437, dated June 28, 1898.

Application filed December 22, 1897. Serial No. 663,041. (Specimens.) Patented in England October 14, 1895, No. 19,253, and in France July 21, 1896, No. 258,853.

*To all whom it may concern:*

Be it known that I, FRITZ BENDER, chemist, doctor of philosophy, residing at Mühlheim-on-the-Main, Grand Duchy of Hessen, Germany, have invented new and useful Improvements in the Manufacture of Amidonaphtholdisulfo-Acid, of which the following is a specification, and for which patents have been obtained in France, No. 258,853, dated July 21, 1896, and in Great Britain, No. 19,253, dated October 14, 1895.

My invention relates to an amidonaphtholdisulfo-acid of the following formula:

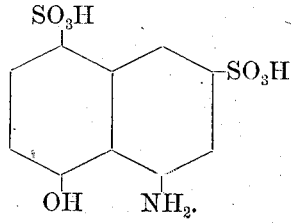

This acid, which I call "acid B" and which is not identical with any of the hitherto-produced amidonaphtholdisulfo-acids, is produced by sulfonating the known 1.8 amidonaphthol 3 monosulfo-acid. The introduction of the sulfo group in the 5 position is effected with great facility.

The following is an example of the mode of carrying this invention into practice; but I do not limit myself to the precise details stated: One part, by weight, of dried and finely-powdered 1.8 amidonaphthol 3 sulfo-acid is poured, without cooling, into five parts, by weight, of ordinary concentrated sulfuric acid. By stirring the monosulfo-acid first gets into solution, but soon the disulfo-acid begins to separate. After some hours the mass is poured on ice, the whole is dissolved by adding hot water, and the acid B (or, rather, its acid sodium salt) is precipitated in a crystalline state by salting out with common salt.

The thus-obtained new product has the following properties: It is easily soluble in hot water, but with difficulty soluble in cold water. The alkaline watery solution shows an intensely-violet fluorescence. The diazo compound is soluble in water with an intensely-yellow color, which by carbonate of soda turns to violet. By boiling with dilute sulfuric acid at 140° centigrade the 5 sulfo group is eliminated and 1.8 amidonaphthol 3 sulfo-acid is regenerated. By heating with about ten parts of caustic-soda lye of six per cent. during about nine hours up to 230° centigrade the amido group is replaced by the hydroxyl group and 1.8 dioxynaphthaline 3.5 (4.6) disulfo-acid is obtained. The acid B can be easily combined with diazo or tetrazo compounds, yielding a large series of beautiful new coloring-matters. Likewise the diazo compound of the acid B can be combined with amins or phenols, yielding new azo coloring-matters.

Now what I claim, and desire to secure by Letters Patent, is the following:

1. The process of producing 1.8 amidonaphthol 3.5 disulfo-acid, which process consists in sulfonating 1.8 amidonaphthol 3 monosulfo-acid, substantially as described.

2. As a new product the new 1.8 amidonaphthol 3.5 disulfo-acid having the composition

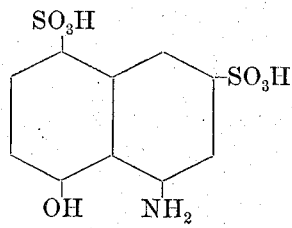

being easily soluble in hot water, but with difficulty soluble in cold water, the alkaline solution showing an intensely-violet fluorescence, the diazo compound being soluble in water with an intensely-yellow color which by carbonate of soda turns to violet; the said acid when boiled with dilute sulfonic acid at 140° centigrade yielding 1.8 amidonaphthol 3 sulfo-acid and when heated with dilute caustic-soda lye up to 230° centigrade yielding 1.8 dioxynaphthalene 3.5 (4.6) disulfo-acid, and being adapted to form an acid sodium salt.

In testimony whereof I have signed my name to this specification in the presence of two subscribing witnesses.

FRITZ BENDER.

Witnesses:
 RICHARD WIRTH,
 EVA SATTLER.